(12) United States Patent
Kong et al.

(10) Patent No.: US 10,821,899 B2
(45) Date of Patent: Nov. 3, 2020

(54) ROTATABLE REAR-VIEW MIRROR WITH DISPLAY

(71) Applicants: Hyundai Motor Company, Seoul (KR); Kia Motors Corporation, Seoul (KR)

(72) Inventors: Nak Kyoung Kong, Seongnam-si (KR); Jong Min Park, Seoul (KR); Ki Hong Lee, Seoul (KR); Keun Sig Lim, Hwaseong-si (KR); Chang Ju Kim, Daegu (KR); Yong Hwan Kim, Gyeongsan-si (KR); Su Young Choi, Gyeongsan-si (KR); Won Bin Kim, Gyeongsan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 23 days.

(21) Appl. No.: 15/815,192

(22) Filed: Nov. 16, 2017

(65) Prior Publication Data
US 2018/0370438 A1 Dec. 27, 2018

(30) Foreign Application Priority Data
Jun. 26, 2017 (KR) .......................... 10-2017-0080797

(51) Int. Cl.
*G02B 5/08* (2006.01)
*G02B 17/00* (2006.01)
(Continued)

(52) U.S. Cl.
CPC .............. *B60R 1/087* (2013.01); *B60R 1/025* (2013.01); *B60R 1/04* (2013.01); *B60R 1/088* (2013.01);
(Continued)

(58) Field of Classification Search
CPC .. B60R 1/088; B60R 1/12; B60R 1/04; B60R 1/00; B60R 2001/1223; B60R 2001/1253;
(Continued)

(56) References Cited

U.S. PATENT DOCUMENTS 9,505,349 B2 11/2016 Fish, Jr. et al.
9,575,315 B2 * 2/2017 Lee .................... G02B 27/0149
(Continued)

FOREIGN PATENT DOCUMENTS

JP 2016-164041 A 9/2016
KR 10-2008-0034528 A 4/2008
KR 10-2011-0078721 A 7/2011

*Primary Examiner* — William R Alexander
*Assistant Examiner* — Tamara Y. Washington
(74) *Attorney, Agent, or Firm* — Morgan, Lewis & Bockius LLP (57) ABSTRACT

A rotatable rear-view mirror with a display may include a rear-view mirror housing having two openings to make it possible to select one of more visible view surfaces of a display mirror and a general mirror, wherein the rotatable rear-view mirror further include a housing coupled to a mounting guide device disposed inside a windshield glass and having two different openings; a mirror device disposed in one of the openings of the housing; and a display device disposed in a remaining one of the openings and wherein the housing may be configured to be rotatable by a predetermined angle based on a first end portion of the mounting guide device so that a rear view is provided through the mirror device or the display device depending on a request of a driver.

10 Claims, 10 Drawing Sheets

(51) Int. Cl.
    *B60R 1/08*      (2006.01)
    *B60R 1/02*      (2006.01)
    *B60R 1/04*      (2006.01)
    *B60R 1/12*      (2006.01)

(52) U.S. Cl.
    CPC ........ *B60R 1/12* (2013.01); *B60R 2001/1253* (2013.01)

(58) Field of Classification Search
    CPC .......... G01J 1/4204; G01J 1/46; G01J 1/4228; G01J 1/26
    USPC ................................................. 359/600–608
    See application file for complete search history.

(56) References Cited

U.S. PATENT DOCUMENTS

2006/0164230 A1\*   7/2006   DeWind et al. ....... B60K 35/00
                                                         340/361
2014/0368657 A1    12/2014   Konuki
2018/0334103 A1\*   11/2018   Kong ........................ B60R 1/12
2018/0370437 A1\*   12/2018   Kong ........................ B60R 1/12

\* cited by examiner

<Front View> - GLASS MODE

FIG. 5A

<Rear View> - GLASS MODE

ROTATABLE REAR-VIEW MIRROR WITH DISPLAY

CROSS-REFERENCE(S) TO RELATED APPLICATIONS

The present application claims priority to Korean Patent Application No. 10-2017-0080797, filed on Jun. 26, 2017, the entire contents of which is incorporated herein for all purposes by this reference.

BACKGROUND OF THE INVENTION

Field of the Invention

The present invention relates to a rotatable rear-view mirror with a display. More particularly, the present relates to a rotatable rear-view mirror with a display, which includes a housing provided with a mirror device and a display device to have two different rear-view surfaces, and in which the housing is configured to be rotatable upwardly or downwardly in response to a request of a driver, providing a rear view through the mirror device or the display device.

Description of Related Art

A rear-view device configured for a vehicle includes a rear-view mirror (or an internal mirror) and external mirrors. The rear-view mirror is disposed on an upper center portion of a windshield glass or on a front center portion of a headlining in an occupant compartment of the vehicle. The external mirrors are disposed on upper front portions of respective opposite doors of the vehicle. Thus, the rear-view mirror allows a driver to see the rear side of the vehicle, and the external mirrors allow the driver to see the opposite sides of the vehicle.

Recently, with regard to providing rear views through the rear-view mirror, development of a rear-view mirror including a display device is becoming increasingly common since the demand for providing reliable rear views while accounting for the quantity of incident light entering the vehicle, the quantity of incident light emitted from a rear vehicle, and the quantity of incident light at night.

Figure 1:
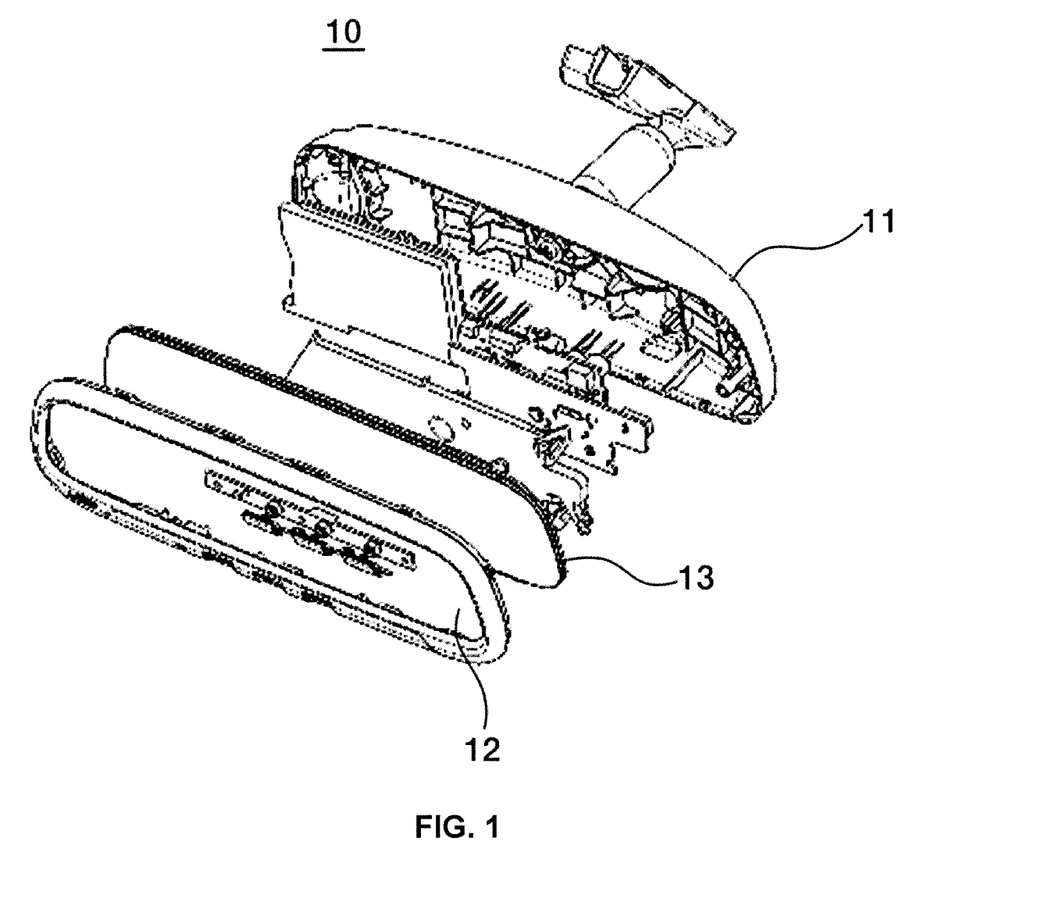
FIG. 1 is a perspective view illustrating a rear-view mirror including a display device and a mirror that are disposed in a single opening, according to a conventional technique.

FIG. 1 illustrates a rear-view mirror 10 including a display device according to a conventional technique.

As shown in the drawing, the conventional rear-view mirror including a housing 11 with an opening is configured wherein a display device 13 and a mirror 12 are disposed in the same opening.

However, as described above, when a display mirror and a general mirror are disposed in the same opening, a double image may occur, thus making it difficult to provide a reliable rear view.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rotatable rear-view mirror with a display which may include a rear-view mirror housing having two openings, allowing selection of one of the more visible view surfaces of a display mirror and a general mirror.

Various aspects of the present invention are directed to providing a rotatable rear-view mirror with a display in which a rear view provided by the display device is identical with a rear view provided by a mirror.

Still various aspects of the present invention are directed to providing a display device and a mirror which can provide a selective rear view depending on driving conditions of the vehicle.

A rotatable rear-view mirror with a display for achieving the above-mentioned objects of the present invention may include the following configuration.

Various aspects of the present invention are directed to providing a rotatable rear-view mirror with a display, including: a housing coupled to a mounting guide device disposed internally to a windshield glass and configured to have two different openings; a mirror device disposed in one of the openings of the housing; and a display device disposed in a remaining one of the openings, wherein the housing is configured to be rotatable by a predetermined angle based on one end portion of the mounting guide device so that a rear view is provided through the mirror device or the display device depending on a request of a driver.

In an exemplary embodiment of the present invention, the rotatable rear-view mirror may further include a slot formed in the housing to enable the housing to rotate on the one end portion of the mounting guide device.

In another exemplary embodiment of the present invention, the rotatable rear-view mirror may further include: a slot-guide device provided on the one end portion of the mounting guide device and disposed in the slot; and a stationary device provided on the mounting guide device. The slot-guide device may be coupled with the stationary device and configured to enable the housing to move upward or downward.

In yet another exemplary embodiment of the present invention, the rotatable rear-view mirror may have at least one stopper provided on each of opposite end portions of the slot so that the amount of rotation of the housing is controlled.

In yet another exemplary embodiment of the present invention, the rotatable rear-view mirror may further include a switch device disposed in the housing to display an image of the rear view on the display device when the housing rotates in one direction thereof.

In still yet another exemplary embodiment of the present invention, the switch device may be converted between an ON state and an OFF state by the slot-guide device which is moved by the rotation of the housing.

In a further exemplary embodiment of the present invention, the windshield glass and the housing may be coupled to each other by the mounting guide device and a ball bearing.

In another further exemplary embodiment of the present invention, the rotatable rear-view mirror may have a controller provided on a rear surface of the display device and configured to control the display device, the controller being configured to control a display image.

In yet another further exemplary embodiment of the present invention, the controller may compensate for the display image taken by a rear-view camera so that the display image has a rear view identical with a rear view of an image projected onto the mirror device.

In yet another further exemplary embodiment of the present invention, the mirror device may be formed of an electronic chromic mirror (ECM).

Other aspects and exemplary embodiments of the invention are discussed infra.

It is understood that the term "vehicle" or "vehicular" or other similar term as used herein is inclusive of motor vehicles in general including passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent form or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(S) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Each of the terms including "part" and unit" written in the specification signifies a device configured for processing at least one function or operation, and this may be embodied by hardware, software or a combination of hardware and software.

In the following detailed description, names of constituents, which are in the same relationship, are divided into "the first", "the second", etc., but the present invention is not necessarily limited to the order in the following description.

Figure 2:
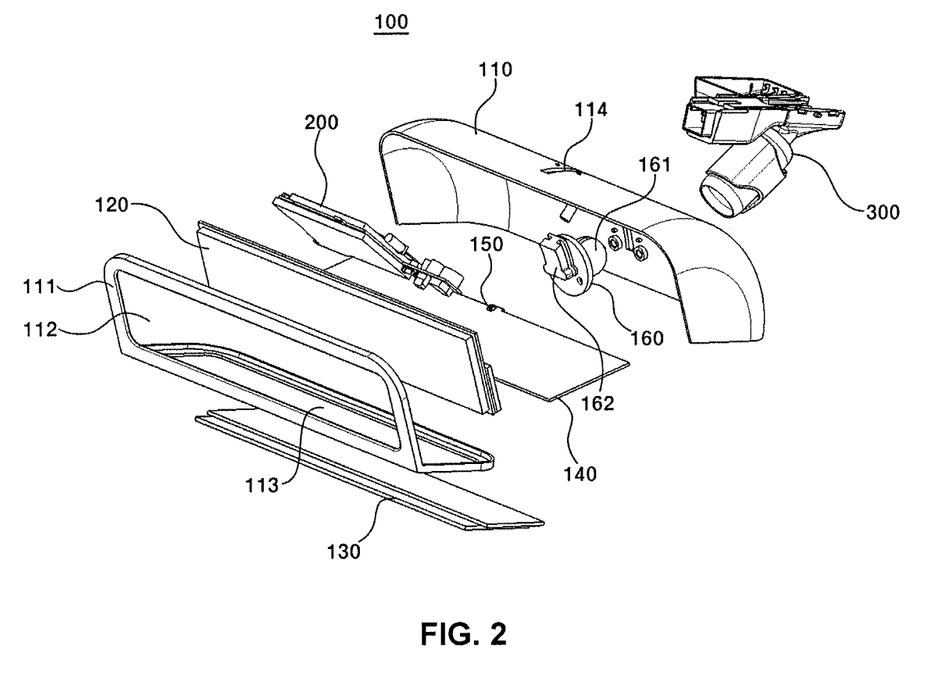
FIG. 2 is a perspective view illustrating a rotatable rear-view mirror with a display, according to an exemplary embodiment of the present invention.

FIG. 2 is a perspective view illustrating a rotatable rear-view mirror 100 with a display, according to an exemplary embodiment of the present invention.

As shown in the drawing, the rotatable rear-view mirror 100 includes a housing 110 having two openings 112 and 113, and a display device 120 and a mirror device 130 that are respectively disposed in the openings 112 and 113. The rotatable rear-view mirror 100 further includes a mounting guide device 300 which is disposed on a rear surface of the display device 120 and configured to fix a controller 140 and the housing 110 to a windshield glass 400.

The windshield glass 400 and the mounting guide device 300 are configured such that they are coupled using a ball bearing 410, wherein the mounting guide device 300 can have a degree of freedom in movement in a predetermined area.

The housing 110 according to an exemplary embodiment of the present invention includes a lower housing 110 having, in a sectional view, an arc shape by a predetermined angle on a point at which two surfaces including the respective openings 112 and 113 intersect each other, and a cover device 111 which is configured to cover the lower housing 110 and has the two openings 112 and 113 formed such that the display device 120 and the mirror device 130 are disposed in the respective openings 112 and 113.

In an exemplary embodiment of the present invention, the housing 110 means a configuration including the cover device 111 coupled to the lower housing 110 and having the two openings 112 and 113.

The rotatable rear-view mirror 100 according to an exemplary embodiment of the present invention includes a slot 114 formed in a rear surface of the housing 110 so that the housing 110 can be rotated by a predetermined angle along the mounting guide device 300 fixed to the windshield glass 400.

The rotatable rear-view mirror 100 further includes a stationary device 160 which is disposed on one end portion of the mounting guide device 300 and configured to couple the mounting guide device 300 to the slot 114 of the housing 110. The stationary device 160 may be coupled to the end portion of the mounting guide device 300 by a ball bearing 161.

In an exemplary embodiment of the present invention, the mirror device 130 is formed of an electronic chromic mirror (ECM) and configured to have a function of dimming light depending on the quantity of light which is incident from the rear of the vehicle.

Furthermore, an electronic toll collection system (ETCS) 200 may be disposed on a sidewall of the housing 110.

The stationary device 160 is configured to be coupled with the slot 114 formed in the rear surface of the housing 110 to allow the housing 110 to rotate. Furthermore, the stationary device 160 is configured to turn ON or OFF a switch device 150 disposed in the housing 110.

The stationary device 160 includes a slot-guide device 162 and is configured wherein the housing 110 can move upward or downward by a predetermined distance under the guidance of the slot-guide device 162.

In other words, the housing 110 is configured wherein it can rotate on the stationary device 160 by a predetermined angle, and the slot-guide device 162 is configured wherein the housing 110 can move upward or downward by a predetermined distance. In the present way, the housing 110 can be configured to be movable upward or downward and rotatable forward or backward thereof.

In an exemplary embodiment of the present invention, the two openings are defined by the cover device 110. The display device 120 is disposed in a first opening 112, and the mirror device 130 is disposed in the other opening (a second opening 113). The display device 120 and the mirror device 130 are oriented by a predetermined angle therebetween on the intersection point between the opening surfaces in which the respective components are disposed.

The controller 140, configured to control the display device 120, is provided on the rear surface of the display device 120, with the display ON/OFF switch device 150 disposed on the controller 140.

An exemplary embodiment of the present invention is configured wherein a rear-view image taken by a rear-view camera 500 is compensated for by the controller 140 disposed on the rear surface of the display device 120 in the housing 110 before the rear-view image is output.

In other words, an image taken by the rear-view camera 500 has differences in imaging range, focus and size from those of a rear view provided by the rear-view mirror 100 using the mirror device 130. Provided the present case, the controller 140 may perform an operation of compensating for an image taken by the rear-view camera 500 making the image substantially equal to an image provided by the mirror device 130.

Moreover, in an exemplary embodiment of the present invention, the mirror device 130 may be formed of an electronic chromic mirror (ECM), so that the controller 140 may control the dimming function of the ECM mirror device 130 depending on the quantity of incident light.

The display ON/OFF switch device 150 according to an exemplary embodiment of the present invention is configured wherein the ON or OFF state of the display can be determined depending on whether the stationary device 160 disposed in the housing 110 comes into contact with the switch device 150 by the rotation of the housing 110. For the present case, when the display device 120 is oriented such that the display device 120 faces the view of the driver to provide the rear view, the switch device 150 is turned ON.

The display ON/OFF switch device 150 is configured to come into contact with the slot-guide device 162 such that the ON or OFF state of the display device 120 can be determined depending on the rotation of the housing 110.

Figure 3:
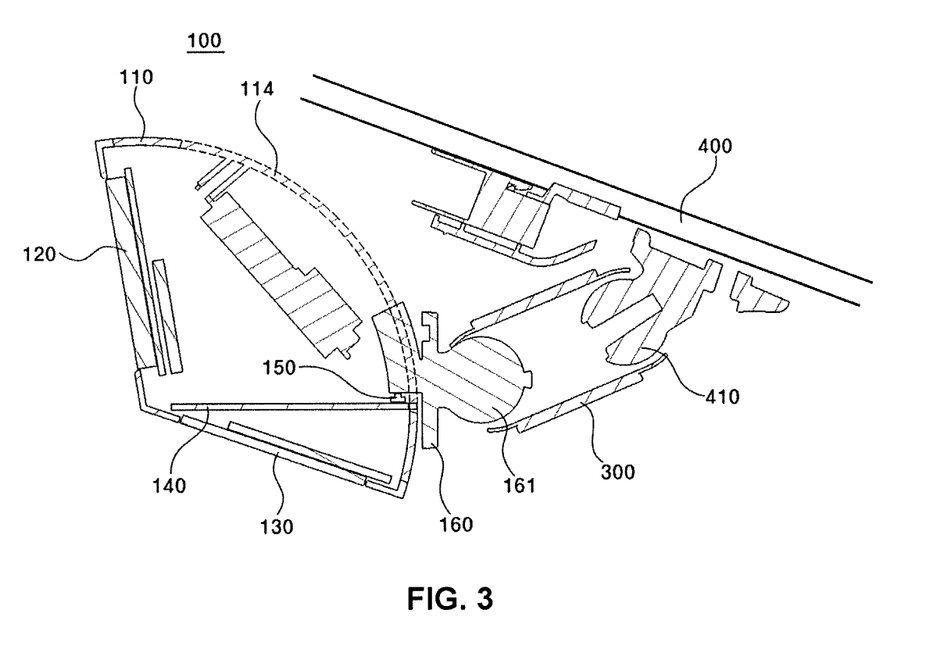
FIG. 3 is a side sectional view illustrating the rotatable rear-view mirror in a display mode, according to an exemplary embodiment of the present invention.

FIG. 3 illustrates a first state for providing a rear view using the display device 120 according to an exemplary embodiment of the present invention.

As shown in the drawing, in the first state, the display device 120 is oriented to face the view of the driver, and the switch device 150 is maintained in a ON state by the stationary device 160. The slot-guide device 162 protruding into the housing 110 may be configured wherein, when the display device 120 is oriented to face the view of the driver, the slot-guide device 162 turns ON the switch device 150.

Moreover, in the first state, the mirror device 130 faces downward, thus solving the problem of a double image which may be formed when the rear view is provided by the display device 120. The mirror device 130 may be disposed to have an angle ranging from at least 90° to 130° relative to the display device 120.

Accordingly, in the first state, the switch device 150 makes contact with the stationary device 160, thus turning ON the display device 120. The controller 140 is configured to compensate for an image taken by the at least one camera 500 disposed externally of the vehicle so that the image corresponds to the rear-view image provided by the mirror device 130, and then displays the compensated image on the display device 120.

Figure 4:
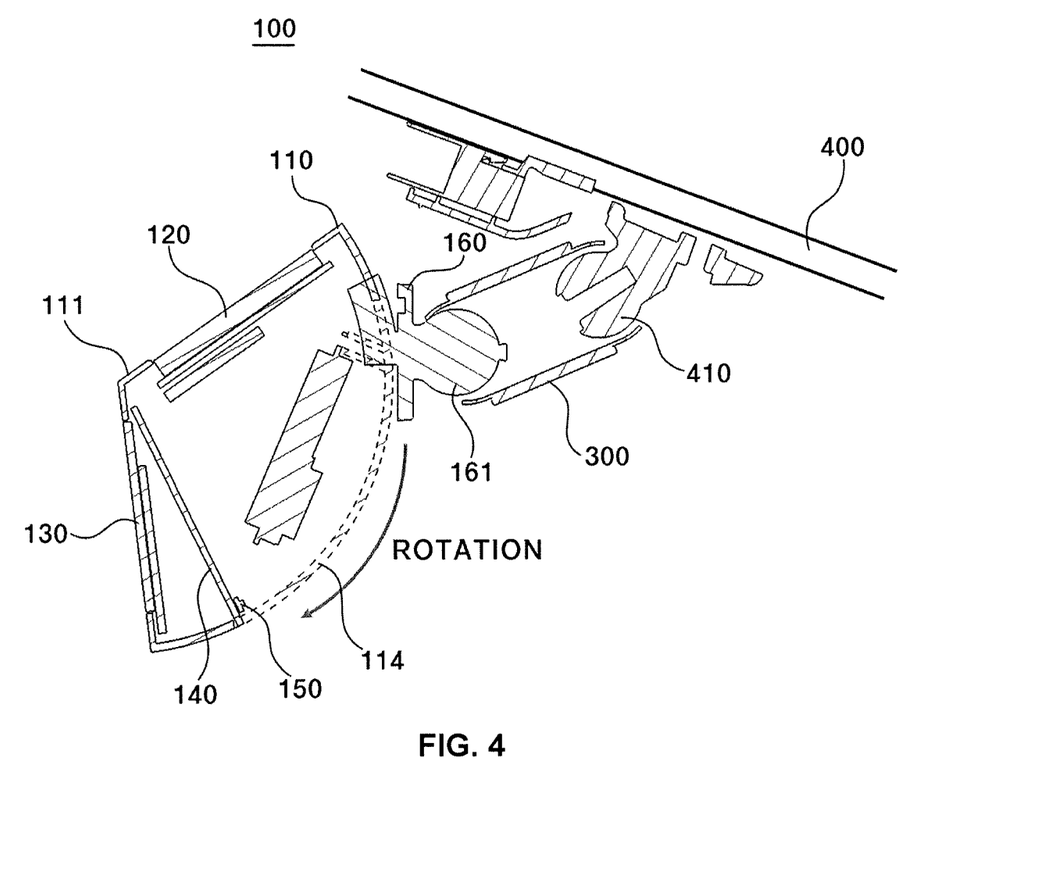
FIG. 4 is a side sectional view illustrating the rotatable rear-view mirror in a mirror mode, according to an exemplary embodiment of the present invention.

FIG. 4 illustrates a second state for providing a rear view using the mirror device 130 according to an exemplary embodiment of the present invention.

As shown in the drawing, the display device 120 may be configured wherein, from the first state in which the display device 120 faces the view of the driver, the display device 120 can rotate in a clockwise direction (downward) by a predetermined angle and thus face the view of the driver.

In the second state, the display device 120 is oriented upward toward a roof, and the switch device 150 is converted into an OFF state, wherein the display device 120 faces the upper side of the vehicle and is maintained in an OFF state. In other words, when the rear view is provided through the mirror device 130 as the second state, the switch device 150 and the stationary device 160 are separated from each other.

Because the mirror device 130 has an angle from at least 90° to 135° relative to the display device 120, when the mirror device 130 faces the view of the driver, a double image can be prevented from being formed.

Figure 5A:
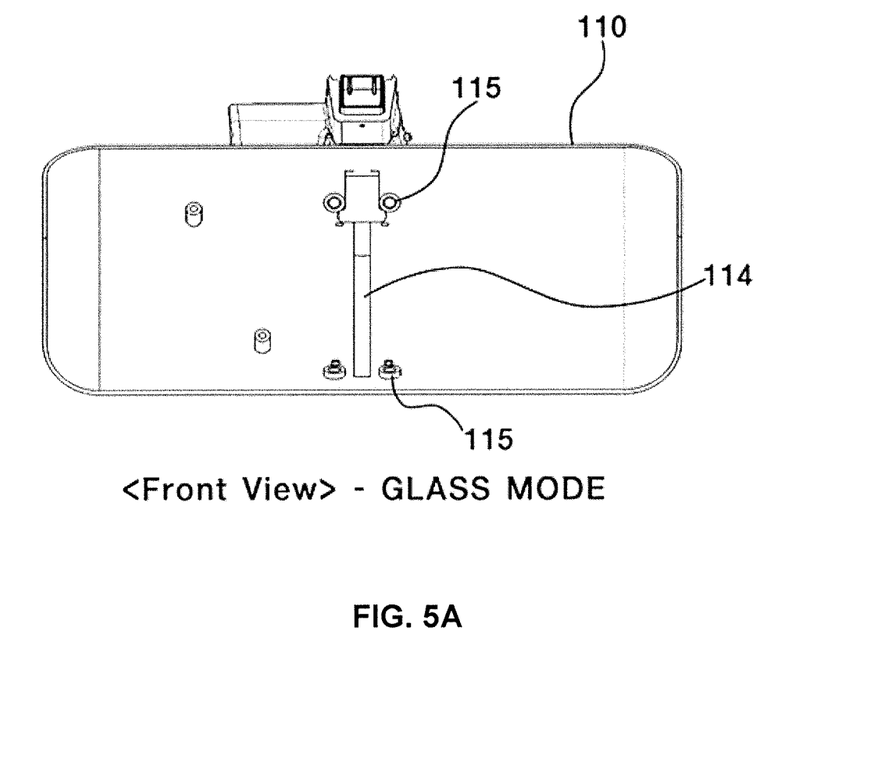
FIG. 5A is a front view illustrating the rotatable rear-view mirror, according to an exemplary embodiment of the present invention.
Figure 5B:
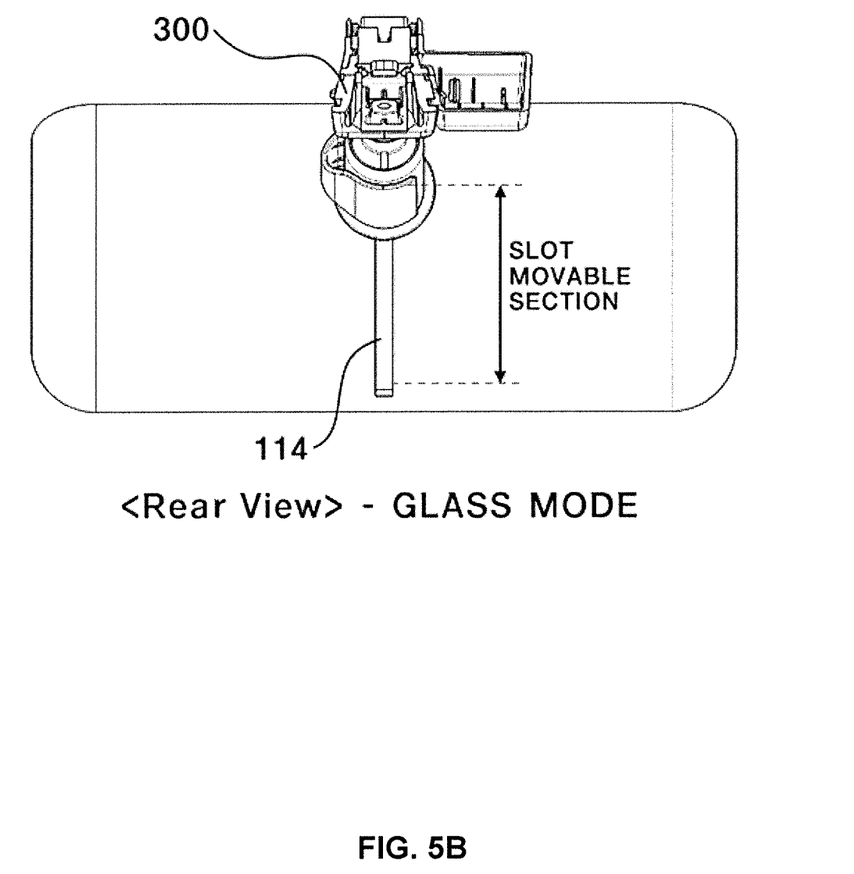
FIG. 5B is a rear view illustrating the rotatable rear-view mirror, according to an exemplary embodiment of the present invention.

FIG. 5A and FIG. 5B show a front view and a rear view, respectively, of the rotatable rear-view mirror 100 according to an exemplary embodiment of the present invention.

As shown in the drawing, the slot 114 is formed in the rear surface of the housing 110 allowing the housing 110 to move upward or downward. Here, the housing 110 is configured to rotate and move by a predetermined angle based on the stationary device 160.

Moreover, at least one stopper 115 is disposed on each of upper and lower end portions of the slot 114 formed in the rear surface of the housing 110. When the housing 110 rotates by the predetermined angle, the stopper 115 comes into contact with the stationary device 160, preventing the housing 110 from further rotating.

Hence, the degree of rotation of the housing 110 is determined depending on the length of the slot 114, and the housing 110 can be prevented from being excessively rotated, wherein the housing 110 or the stationary device 160 can be prevented from being damaged.

The slot 114 according to an exemplary embodiment of the present invention is formed at allow the housing 110 to rotate within a predetermined angular range so that each of the two surfaces of the housing 110 including the openings can face the user. Provided the present case, the two stoppers 115 may be disposed on the respective opposite end portions of the slot 114 herein the user can selectively face each of the surfaces on which the display device 120 and the mirror device 130 are respectively disposed.

Figure 6A:
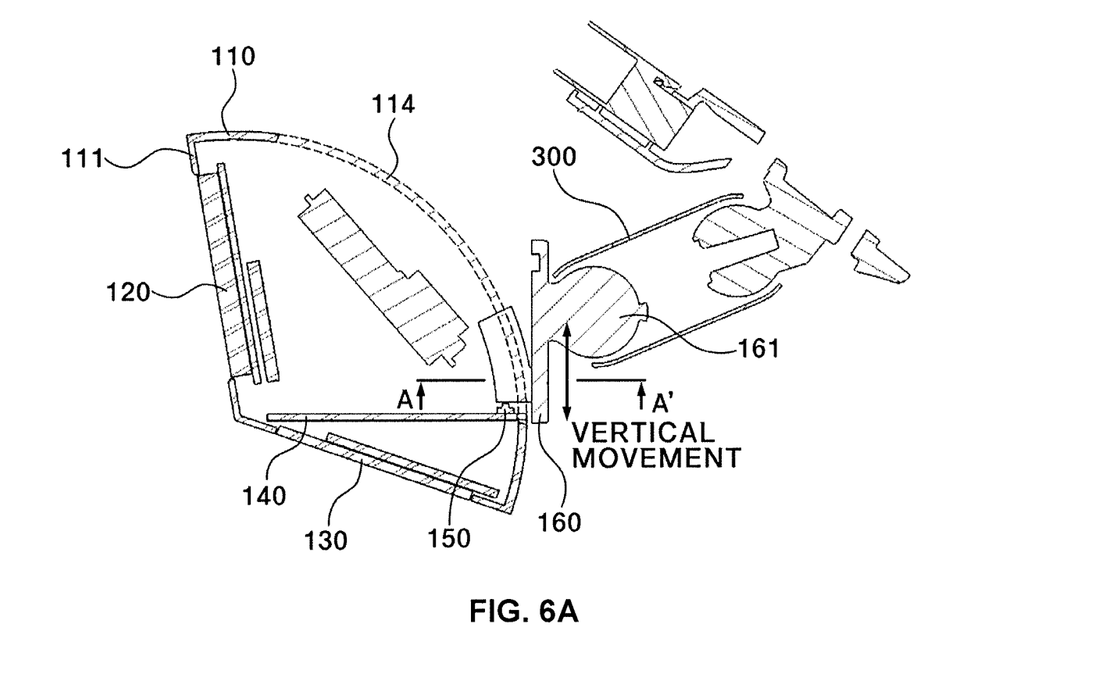
FIG. 6A is a sectional view illustrating the rotatable rear-view mirror before a housing is moved upward, according to an exemplary embodiment of the present invention.

FIG. 6A illustrates the stationary device 160 coupled to the housing 110 of the rear-view mirror 100 according to an exemplary embodiment of the present invention to show a configuration in which the housing 110 can be moved upward or downward by the slot-guide device 162 disposed on the stationary device 160.

As shown in the drawing, the slot-guide device 162 disposed in the slot 114 of the housing 110 is located on one end portion of the stationary device 160. More specifically, a first end portion of the slot-guide device 162 is disposed in the sot 114 of the housing 110, and a second end portion thereof is coupled to the stationary device 160 so that the slot-guide device 162 can move in a vertical direction along a height of the stationary device 160.

In other words, the stationary device 160 is configured wherein the slot-guide device 162 coupled to the stationary device 160 can move along the slot 114 formed in the rear surface (having an arc shape in a sectional view) of the housing 110. Here, the slot-guide device 162 disposed in the slot 114 is coupled to the stationary device 160 to be vertically movable upward or downward based on the stationary device 160. Therefore, the entirety of the housing 110 can vertically move based on the stationary device 160 which is coupled to the mounting guide device 300 by the ball bearing 161.

An exemplary embodiment of the present invention in which the slot-guide device 162 can vertically move based on the stationary device 160 can provide a configuration of the rear-view mirror 100 configured for adjusting a difference in height of the rear-view mirror 100 which may occur between the first state in which the display device 120 provides the rear view and the second state in which the mirror device 130 provides the rear view.

As shown in FIG. 3, in the first state in which the display device 120 provides the rear view, the display device 120 is disposed at a higher position than the stationary device 160. As shown in FIG. 4, in the second state, the mirror device 130 is disposed at a lower position than the stationary device 160. Hence, there is a difference in height of the view surface for providing the rear view to the user between the first state and the second state.

To compensate for a difference in height of the view surface between the first state and the second state, the slot-guide device 162 is configured to allow the housing 110 to move in the vertical direction thereof. In other words, the slot-guide device 162 of the present invention allows moving the housing 110 in the vertical direction so that the view surfaces provided in the first and second states can match each other.

Figure 6B:
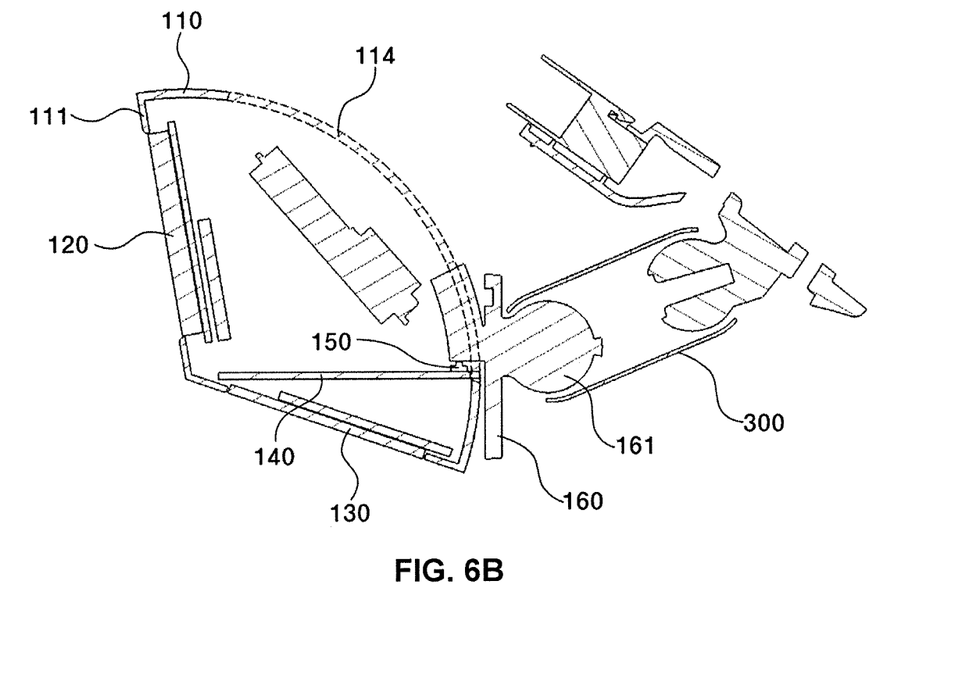
FIG. 6B is a view illustrating the operation of the rotatable rear-view mirror when the housing moves upward, according to an exemplary embodiment of the present invention.

As shown in FIG. 6B, the view surface in the second state can be moved upward and adjusted to have the same height as the view surface provided by the display device 120 in the first state.

On the contrary to the present condition, in the case where the rotatable rear-view mirror is converted from the second state to the first state, the slot-guide device 162 is moved downward based on the stationary device 160. In the present way, the view surfaces for providing the rear view to the user in the first and second states may have the same height.

Figure 7:
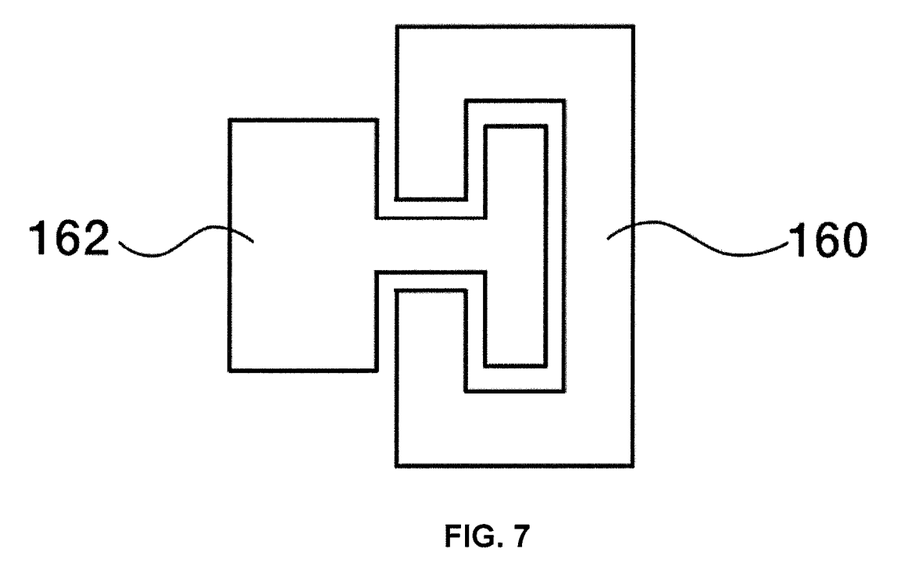
FIG. 7 illustrates a coupling relationship between a slot-guide device and a stationary device of the rotatable rear-view mirror, according to an exemplary embodiment of the present invention.

FIG. 7 is a sectional view illustrating the coupling relationship between the slot-guide device 162 and the stationary device 160 of the rotatable rear-view mirror, according to an exemplary embodiment of the present invention.

As shown in the drawing, the first end portion of the slot-guide device 162 is disposed in the housing 110 and may be brought into contact with the switch device 150 depending on the rotation of the housing 110. The switch device 150 may be formed as a contact switch or a push switch. When the slot-guide device 162 comes into contact with the switch device 150, the display device 120 is maintained in the ON state, and when it is spaced apart therefrom, the display device 120 is converted into the OFF state.

Furthermore, the slot-guide device 162 is coupled in the stationary device 160 so that they can be prevented from being removed from each other. In an exemplary embodiment of the present invention, the slot-guide device 162 may include a T-shaped coupling portion which is coupled to an internal slot of the stationary device 160.

Furthermore, the slot-guide device 162 is configured to be movable upward or downward along the internal slot of the stationary device 160. As the slot-guide device 162 coupled with the housing 110 moves, the housing 110 can move upward or downward integrally with the slot-guide device 162.

Figure 8:
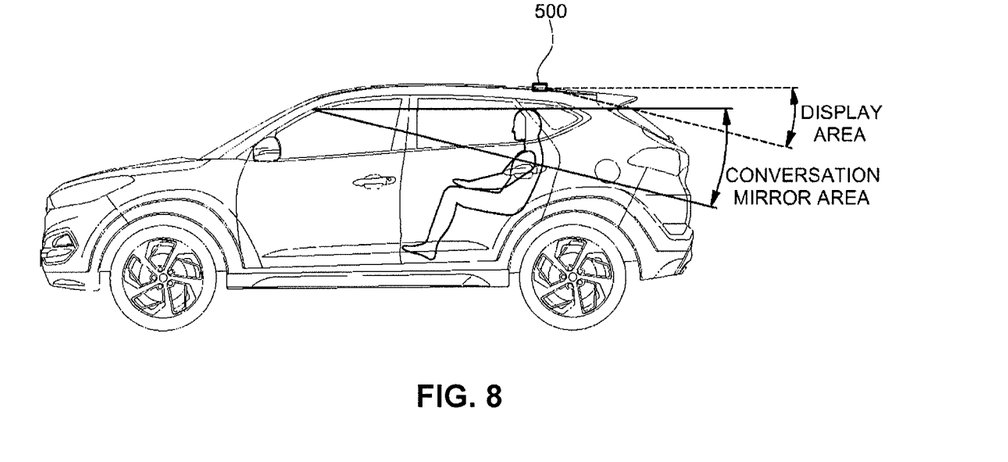
FIG. 8 illustrates rear-view areas of the rotatable rearview mirror, according to an exemplary embodiment of the present invention.

FIG. 8 illustrates a conversation mirror area provided by the mirror device 130 and a display area within which an image is taken by the camera 500, according to an exemplary embodiment of the present invention.

As described above, when a rear view is provided through the mirror device 130, there are differences in range, focus, and size between the rear view and an image provided by the camera 500 disposed on the external surface of the vehicle.

Therefore, the controller 140 according to an exemplary embodiment of the present invention is configured to receive an image taken external to the vehicle and compensate for the received image so that a rear view based on the received image can correspond to that of the conversation mirror area provided by the mirror device 130.

Preferably, in an exemplary embodiment of the present invention, the camera 500 disposed on the external surface of the vehicle may include a plurality of cameras 500 to provide surrounding views of the vehicle. The controller 140 may be configured to edit and compensate for images taken by the plurality of cameras 500 to provide an image corresponding to the rear view provided by the mirror device 130.

In other words, the controller 140 according to an exemplary embodiment of the present invention may be configured to edit an image taken by at least one camera 500 such that the image has the same range, focus and size as those of the rear view provided by the mirror 130. The controller 140 may display the edited and compensated image on the display device 120.

As is apparent from the above description, a rotatable rear-view mirror with a display according to an exemplary embodiment of the present invention has the following effects.

The present invention has an effect of providing a clearer rear view by removing a double image which may be caused by an overlap between a display device and a mirror.

Various aspects of the present invention are directed to providing different modes of rear view, according to the driving conditions of a vehicle.

Moreover, in an exemplary embodiment of the present invention, a compensation process is performed wherein a rear view provided by the display device has the same area as that of a rear view provided by the mirror, herein there is an effect of minimizing unfamiliarity in driving which may be caused when the rear view is obtained through the display device.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the preset invention, as well as various alternatives and modifications thereof. It is intended that the scope of is the invention be defined by the Claims appended hereto and their equivalents.

What is claimed is:

1. A rotatable rear-view mirror with a display, comprising:
    a housing coupled to a mounting guide device disposed inside a windshield glass and having a first opening and a second opening;
    a mirror device disposed in the first opening of the housing; and
    a display device disposed in the second opening
    wherein the housing is configured to be rotatable by a predetermined angle based on one end portion of the mounting guide device so that a rear view is provided through the mirror device or the display device depending on a request of a driver, and
    wherein the first opening of the housing and the second opening of the housing are oriented by a predetermined angle on an intersection point of the first opening and the second opening, and
    wherein a rotation center of the housing is positioned to be offset from the one end portion of the mounting guide device and the one end portion of the mounting guide device is coupled to the housing along a rotation trajectory of the housing, the rotation trajectory being formed along a contour of the housing, and
    wherein the housing is configured to rotate along the rotation trajectory for selecting of one of visible view surfaces of the display device and the mirror.

2. The rotatable rear-view mirror of claim 1, further including:
    a slot formed on the contour of the housing along the rotation trajectory to be configured for the housing to rotate on the one end portion of the mounting guide device along the rotation trajectory.

3. The rotatable rear-view mirror of claim 2, further including:
    a slot-guide device provided on the one end portion of the mounting guide device and disposed in the slot; and
    a stationary device provided on the mounting guide device,
    wherein the slot-guide device is coupled with the stationary device and configured for the housing to move upward or downward therefrom.

4. The rotatable rear-view mirror of claim 2, including at least one stopper provided on each of opposite end portions of the slot so that an amount of a rotation of the housing is controlled.

5. The rotatable rear-view mirror of claim 1, further including:
    a switch device disposed in the housing to display an image of the rear view on the display device when the housing rotates in a direction thereof.

6. The rotatable rear-view mirror of claim 5, wherein the switch device is converted between an ON state and an OFF state by the slot-guide device which is moved by a rotation of the housing.

7. The rotatable rear-view mirror of claim 1, wherein the windshield glass and the housing are coupled to each other by the mounting guide device and a ball bearing.

8. The rotatable rear-view mirror of claim 1, including a controller provided on a rear surface of the display device to control the display device, the controller being configured to control a display image.

9. The rotatable rear-view mirror of claim 8, wherein the controller is configured to compensate for the display image taken by a rear-view camera so that the display image has a rear view identical with a rear view of an image projected onto the mirror device.

10. The rotatable rear-view mirror of claim 1, wherein the mirror device includes an electronic chromic mirror (ECM).

* * * * *